United States Patent
Rotola-Pukkila et al.

(10) Patent No.: US 6,658,064 B1
(45) Date of Patent: Dec. 2, 2003

(54) METHOD FOR TRANSMITTING BACKGROUND NOISE INFORMATION IN DATA TRANSMISSION IN DATA FRAMES

(75) Inventors: Jani Rotola-Pukkila, Tampere (FI); Hannu Mikkola, Tampere (FI); Pekka Kapanen, Tampere (FI); Janne Vainio, Lempäälä (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/387,369

(22) Filed: Aug. 31, 1999

(30) Foreign Application Priority Data

Sep. 1, 1998 (FI) .................................................. 981869

(51) Int. Cl.[7] .............................................. G10L 11/06
(52) U.S. Cl. ...................................... 375/295; 704/215
(58) Field of Search ................................ 375/259, 219, 375/295; 370/337; 704/215

(56) References Cited

U.S. PATENT DOCUMENTS

| | | | |
|---|---|---|---|
| 5,557,639 A | 9/1996 | Heikkila et al. | 375/224 |
| 5,596,677 A | 1/1997 | Jarvinen et al. | 395/2.29 |
| 5,612,955 A | 3/1997 | Fernandes et al. | 370/433 |
| 5,835,889 A | 11/1998 | Kapanen | 704/215 |
| 5,854,978 A | 12/1998 | Heidari | 455/418 |
| 5,893,061 A | 4/1999 | Gortz | 704/262 |
| 6,347,081 B1 * | 2/2002 | Bruhn | 370/318 |

FOREIGN PATENT DOCUMENTS

FI      100932    3/1998

OTHER PUBLICATIONS

Finnish Office Action.

* cited by examiner

Primary Examiner—Stephen Chin
Assistant Examiner—David B. Lugo
(74) Attorney, Agent, or Firm—Perman & Green, LLP

(57) ABSTRACT

The invention relates to a method for transmitting background noise information including a silence descriptor identifier and background noise parameters in a communication system in which the information to be transmitted is formed into data frames. The data frames are subjected to channel coding to form channel-coded frames. The channel-coded frames are interleaved to be transmitted in two or more data transmission frames, and information of two channel-coded frames is transmitted in each data transmission frame. A first silence descriptor frame is formed provided with the silence descriptor identifier. The first silence descriptor frame is subjected to channel coding to form a channel-coded silence descriptor frame. The channel-coded silence descriptor frame is transmitted in two or more data transmission frames, and at least one data transmission frame transmitting part of the channel-coded silence descriptor frame is also used to transmit at least the background noise parameters.

18 Claims, 8 Drawing Sheets

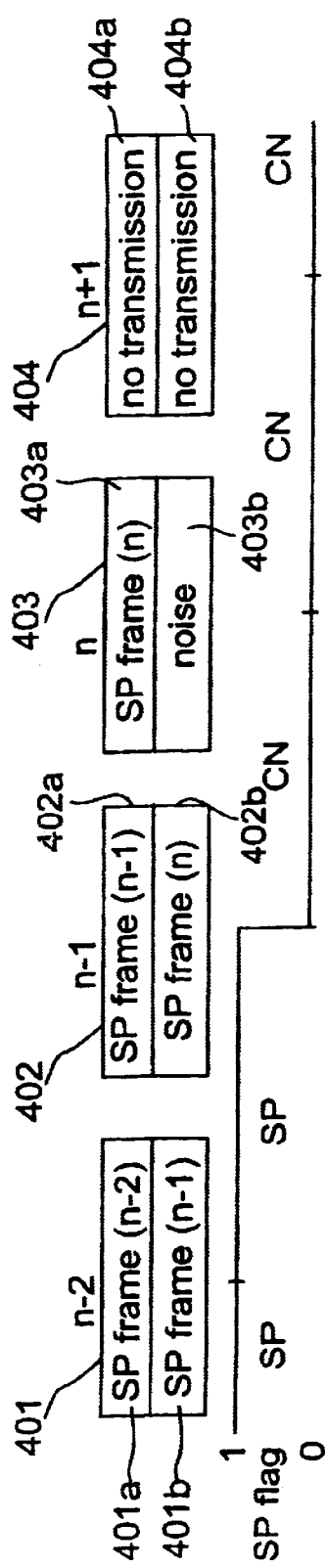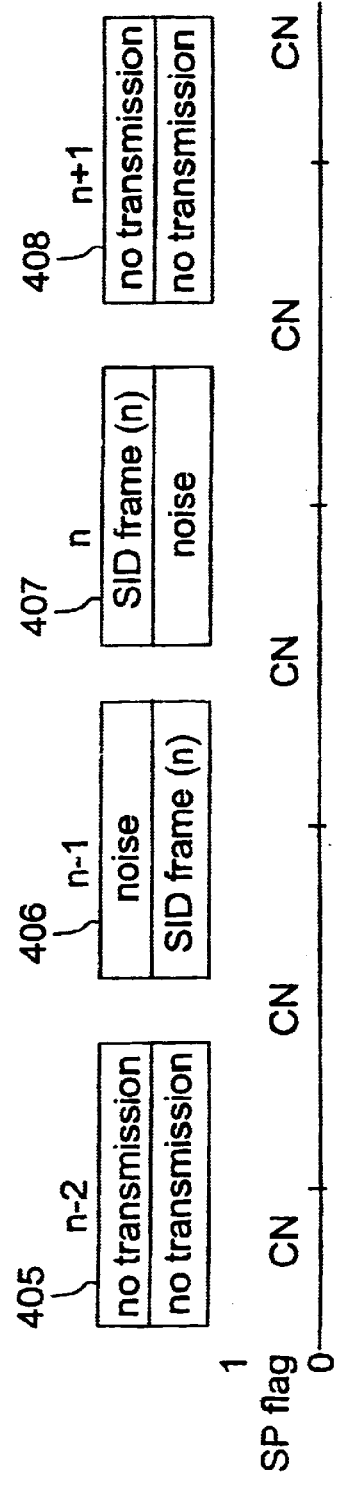
Fig 4a  Prior Art
Fig 4b  Prior Art

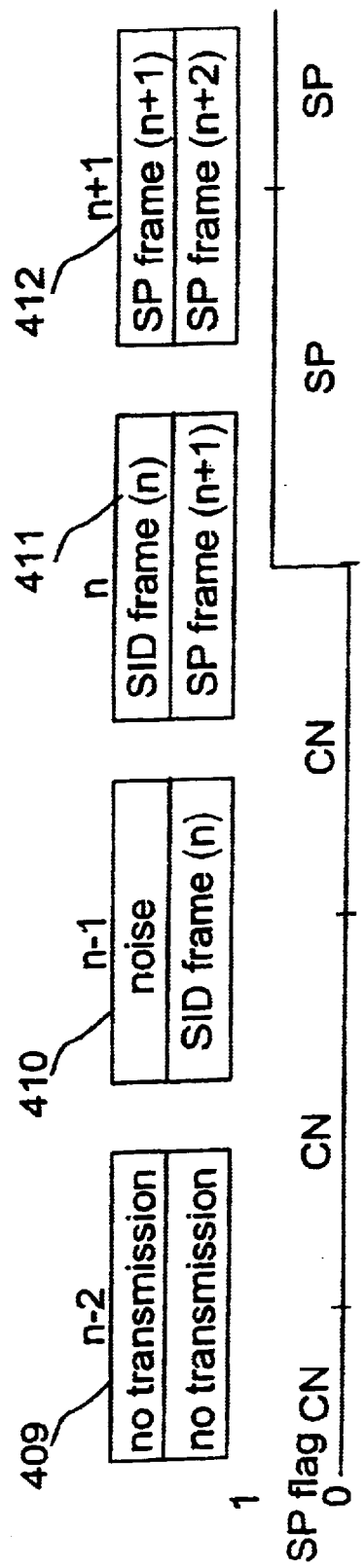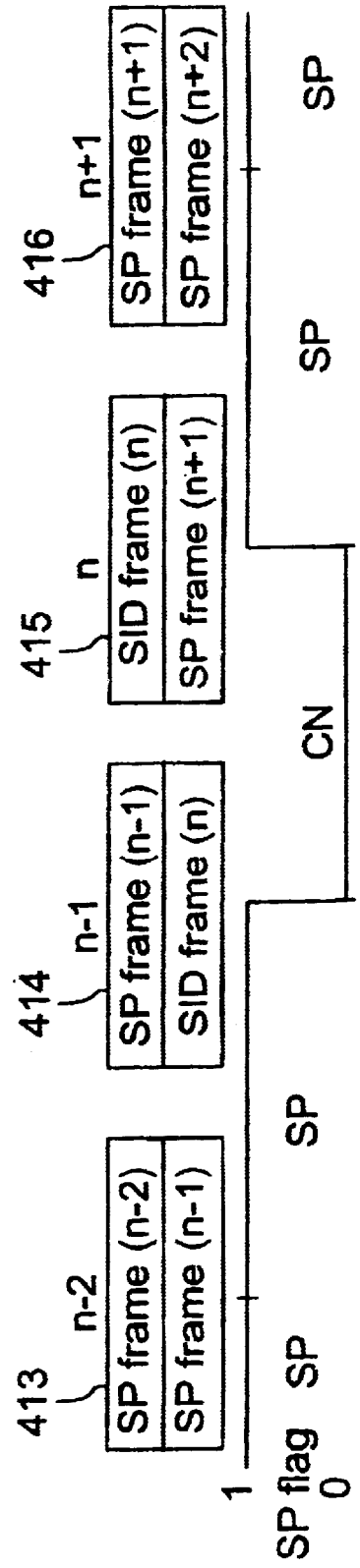
Fig 4c  Prior Art
Fig 4d  Prior Art

METHOD FOR TRANSMITTING BACKGROUND NOISE INFORMATION IN DATA TRANSMISSION IN DATA FRAMES

BACKGROUND OF THE INVENTION

1. Field of the Inventions

The present invention relates to a method for improving detectability of a data frame transmitting background noise information including a silence descriptor identifier and background noise parameters in a communication system in which the information to be transmitted is formed into data frames, said data frames are subjected to channel coding to form channel-coded frames, said channel-coded frames are interleaved to be transmitted in two or more data transmission frames, and information of two channel-coded frames is transmitted in each data transmission frame. The invention relates also to a communication system providing detectability of a data frame transmitting background noise information including a silence descriptor identifier and background noise parameters, the communication system comprising means for forming data frames of information to be transmitted, means for channel coding said data frames to form channel-coded data frames, means for interleaving said channel-coded data frames for transmission in two or more data transmission frames, wherein information of two channel-coded frames is arranged to be transmitted in each data transmission frame. The invention relates further to a mobile station providing improved detectability of a data frame transmitting background noise information including a silence descriptor identifier and background noise parameters, the mobile station comprising means for forming data frames of information to be transmitted, means for channel coding said data frames to form channel-coded data frames, means for interleaving said channel-coded data frames for transmission in two or more data transmission frames, wherein information of two channel-coded frames is arranged to be transmitted in each data transmission frame. The invention relates still further to a network element providing detectability of a data frame transmitting background noise information including a silence descriptor identifier and background noise parameters, the network element comprising means for forming data frames of information to be transmitted, means) for channel coding said data frames to form channel-coded data frames, means for interleaving said channel-coded data frames for transmission in two or more data transmission frames, wherein information of two channel-coded frames is arranged to be transmitted in each data transmission frame, means for deinterleaving received data transmission frames, means for channel decoding, and means for restoring information from channel-decoded data.

2. Brief Description of Related Developments

In data transmission in the form of data frames, the information to be transmitted is usually divided into data frames of fixed size. In addition to information, the data frames can contain header data and other data required in the transmission of the data frames. The data frames are transmitted from a sender to a receiver via a communication channel, which may comprise e.g. the radio channel or another wireless communication channel. The communication channel is subject to interference, such as ignition interference caused by electric equipment and in wireless data transmission, on the other hand, interference caused by other similar devices, such as radio transmitters. Another significant source of interference particularly in mobile transmitter/receiver devices is the fact that the signal to be received can enter the receiver via several routes of different lengths, wherein distortions are caused in the signal received. Consequently, for eliminating errors of transmission, data frames are usually equipped with error correction data or at least error detection data. One method to add error correction data is the use of so-called convolution codes, i.e. the information to be transmitted is encoded by using a suitable convolution code, wherein the convolution coded information is transmitted to the communication channel. At the receiving stage, a reverse operation is made to distinguish the transmitted information from the received data transmission flow. The error detecting data used is most usually parity checking data which is calculated from the information to be transmitted, or at least part of it. One such known parity checking method is the cyclic redundancy check (CRC). Thus, at the receiving end, the corresponding operation is made on the received information and the parity checking data generated at the receiving end is compared with the received parity checking data. If the data match, the receiving device interprets that the information was received correctly. If the calculated and received parity data do not match, a so-called BFI flag (bad frame indication) is set, to indicate to the receiving device that the received data frame was at least partly incorrect. After this, it is possible to request retransmission or an attempt can be made to interpret the incorrect frame e.g. by extrapolation or interpolation.

In current digital mobile communication systems, also speech is transmitted in the form of data frames. For example in the GSM mobile communication system (Global System for Mobile Communications), in the speech communication channel, most of the digital information generated from the audio signal is protected by error correction coding.

Furthermore, current digital mobile communication systems use a so-called discontinuous transmission, wherein the transmitter can be switched off for the time of pauses in speech. This reduces e.g. the power consumption and increases the usage time of the wireless communication device. Moreover, this discontinuous transmission reduces interference in other simultaneous data transmission connections. It is thus possible to improve the quality of the transmission. In practice, however, the transmission is not cut off for the time of the whole pause, but information is transmitted at intervals on background noise which is generated into audible noise in the receiver, corresponding substantially to the volume and frequency spectrum of noise detected at the transmission end. This generation of background noise is a further facility compared to muting the receiver completely for the time of pauses in speech. This background noise is typically transmitted in so-called silence descriptor frames SID at a lower bit rate than speech.

The frequency of transmitting these silence descriptor frames depends e.g. on the communication system used at the time. For example in the GSM mobile communication system according to prior art, speech coding takes place either at full rate (FR or enhanced full rate EFR) or at half rate (HR). During discontinuous transmission, only every 24th frame is transmitted in an FR channel (every 12th frame in an HR channel). All frames to be transmitted during discontinuous transmission are silence descriptor frames. In future mobile communication systems, it is possible to use e.g. adaptive multirate speech codecs (AMR). In silence descriptor frames of such systems, it is possible to transmit not only background noise but also information on the quality of the backward channel of the channel pair (uplinkdownlink) used in the connection. For example, in communication between a mobile station and a network element such as a base transceiver station, the transmitting mobile station measures the quality of its receiving channel, i.e. the downlink of the base transceiver station, and transmits quality information in these silence descriptor frames to the base transceiver station. This quality information must be updated regularly to find out a possible need for change of the channel or the base transceiver station. For example in the AMR system, quality information must be transmitted more often than presently because of the change of the codec; consequently, quality information must also be transmitted as part of silence descriptor frames, which should therefore also be transmitted more often than presently.

In the decoder of the receiving device, such as a base transceiver station, the background noise is generated from the received silence descriptor frames at a different way than speech is generated from received data frames containing speech information. Therefore, the decoder of the receiving device must be capable of distinguishing between silence descriptor frames and speech frames. In systems of prior art, this is achieved in a way that silence descriptor frames include a so-called silence descriptor identifier SID-CW (SID code word). This silence descriptor identifier is prior known to both the transmitter and the receiver. Thus, if the received data frame contains this silence descriptor identifier, the decoder processes the received data frame as a silence descriptor frame.

The probability for the fact that a speech frame is identified incorrectly as a silence descriptor frame is:

$$P_{SPioSID} = \sum_{i=0}^{N_{err}} \binom{N_{SID}}{i} 0, 5^{N_{SID}}, \quad (1)$$

wherein

| | |
|---|---|
| $N_{SID}$ | is the length of the silence descriptor identifier and |
| $N_{err}$ | is the maximum number of allowed errors in the silence descriptor identifier. |

It is assumed in formula 1 that the probabilities for all possible bit combinations are equal. Moreover, the errors in the transmission channel are assumed to maintain this probability distribution.

The probability that a silence descriptor frame is identified as a speech frame depends e.g. on the conditions in the communication channel. If the communication channel used is of high quality, data transmission is relatively flawless and the error probability rate is low. The number of data transmission errors increases with impaired quality of the communication channel, wherein also error possibilities in the silence descriptor identifier are increased, which increases the probability that the silence descriptor frame is not identified correctly.

The silence descriptor identifier must be sufficiently long to identify the received frames as reliably as possible. If the silence descriptor identifier is too short, the probability that a speech frame is identified as a silence descriptor frame increases. If the silence descriptor identifier or part of it is transmitted in the unprotected part of the data frame, the probability that the silence descriptor identifier contains errors is greater than in a situation where all bits of the silence descriptor identifier are transmitted in the protected part of the data frame.

For example in the GSM mobile communication system, interleaving of data frames is used, i.e., one data frame is not sent in full but it is divided into e.g. four or eight elements. These elements are transmitted in successive bursts, however in a way that one burst contains one element of two different data frames. This interleaving is illustrated in a skeleton diagram in the appended FIGS. 1a and 1b. FIG. 1a shows an example of a full rate speech channel in the GSM system, wherein each data frame to be transmitted is divided into eight elements. In a corresponding manner, FIG. 1b shows a half rate speech channel, wherein the data frames are divided into four elements and transmitted in successive bursts. With this interleaving, an attempt is made to reduce the effect of interferences, which occur typically in bursts in the radio channel, in the reliability of the transmission.

In the system of FIG. 1a, one channel-coded speech frame in the full-rate speech channel consists of 456 bits. This channel-coded speech frame is divided into eight partial blocks consisting of 57 bits so that the first bit (bit 0) is placed in the first partial block, the second bit (bit 1) is placed in the second partial block, the third bit (2) in the third partial block, the eighth bit (7) in the eighth partial block, the ninth bit (8), in turn, in the first partial block, etc. After this, these eight partial blocks are placed in eight bursts so that the bits of the first partial block are placed in the even bits of the first burst, the bits of the second partial block are placed in the even bits of the second burst, the bits of the third partial block are placed in the even bits of the third burst, and the bits of the fourth partial block are placed in the even bits of the fourth burst. In a corresponding manner, the bits of the four next partial blocks are placed in the odd bits of the four next bursts. In this example, each burst consists of 114 bits. The odd bits of the four first bursts comprise the bits of the four last partial blocks of the previous channel-coded frame to be transmitted. In a corresponding manner, the even bits of the four latter bursts comprise the bits of the four first partial blocks of the channel-coded frame to be transmitted next. In this way, one burst comprises, as a rule, bits of two channel-coded frames. One purpose of this arrangement and interleaving is to reduce the effect of interference in the communication channel in several consecutive bits of the same data frame. Thus, errors are distributed in several different data frames, wherein possible bit errors can be better detected and even corrected by error detection and correction methods.

In a corresponding manner, in the half-rate channel of FIG. 1b, one channel-coded speech frame consists of 228 bits and is interleaved in four bursts. Thus, each burst consisting of 114 bits contains bits of two successive speech frames. In practice, this interleaving has the effect that at the moment of cutting off the transmission, the burst of the last element of the data frame to be transmitted contains an extra data frame element to complete the number of bits to be transmitted in a burst (114 bits). However, this extra element is not used at the receiving stage. Correspondingly, in a situation where transmission is turned on again, an extra data frame element is transmitted in the first burst to be used. Also this element is not used at the receiving stage. This interleaving in the GSM system is defined in more detail in the standard GSM 05.03 which also describes channel coding in full-rate and half-rate channels of the GSM system.

In practical communication systems, it is not possible to protect all the bits to be transmitted, wherein some of the data frame bits are unprotected when transmitted. On the other hand, for achieving as reliable a silence descriptor frame as possible, the silence descriptor identifier must be made as long as possible, wherein it is a problem in the systems of prior art that some of the bits of the silence descriptor identifier must be transmitted unprotected, which increases the error rate in the transmission of the silence descriptor identifier to the receiver. For example, in the GSM AMR speech coding method under development, the lowest suggested bit rate can be greater than in the presently used half-rate audio coding in the GSM system, where the bit rate is 5.6 kbit/s. The total rate in the half-rate channel of the GSM system, including also the bits added in channel coding, is 11.4 kbit/s. As a result, in ARM speech coding in the GSM system, there are not necessarily as many protected bits available as in half-rate speech coding of the GSM system presently in use. Furthermore, some of the protected bits are used for the transmission of channel quality data, wherein there are not sufficiently protected bits left for the transmission of the silence descriptor identifier in a sufficiently reliable way. The appended FIG. 2 shows an error rate for the incorrect identification of a speech frame as a silence descriptor frame. In the figure, three silence descriptor identifiers of different lengths are used as examples (44 bits, curve 2A; 89 bits, curve 2B; 118 bits, curve 2C), and the error rate of the half-rate channel of the GSM system of prior art is presented for comparison, wherein the length of the silence descriptor identifier is 79 bits (curve 2D). In a corresponding manner, FIG. 3 illustrates the probability that a silence descriptor frame is identified in the receiver incorrectly as a speech frame. Two silence descriptor identifiers of different lengths are used here: 44 bits (curve 3A) and 89 bits (curve 3B) as well as, for comparison, the error rate of a silence descriptor frame of the GSM 79 bit half-rate channel (curve 3C). The error rates of FIGS. 2 and 3 are calculated as a function of the number of allowed incorrect bits in the silence descriptor identifier. On the basis of FIGS. 2 and 3, it can be noticed that with the silence descriptor identifier lengths of 44 or 89 bits, identification is not as reliable for identifying both the silence descriptor frame and the speech frame correctly as with the 79 bit silence descriptor identifier used in the half-rate channel of the GSM system.

SUMMARY OF THE INVENTION

It is an aim of the present invention to achieve a method for more reliable transmission of silence descriptor frames, as well as a communication system. The method of the present invention is characterized in that:

a first silence descriptor frame is formed provided with the silence descriptor identifier, said first silence descriptor frame is subjected to channel coding to form a channel-coded silence descriptor frame, said channel-coded silence descriptor frame is transmitted in two or more data transmission frames, at least one data transmission frame transmitting part of said channel-coded silence descriptor frame is also used to transmit at least the background noise parameter.

The communication system of the present invention is characterized in that the communication system comprises further:

means for forming at least a first silence descriptor frame to be transmitted at a time, said first silence descriptor frame comprising a silence descriptor identifier, means for channel coding of said first silence descriptor frame, to form a channel-coded silence descriptor frame, means for transmitting said channel-coded silence descriptor frame in two or more data transmission frames, means for using at least one data transmission frame, containing part of said channel-coded silence descriptor frame, to transmit at least the background noise parameters.

The mobile station of the present invention is characterized in that the mobile station comprises further:

means for forming at least a first silence descriptor frame (to be transmitted at a time, said first silence descriptor frame comprising a silence descriptor identifier, means for channel coding of said first silence descriptor frame, to form a channel-coded silence descriptor frame, means for transmitting said channel-coded silence descriptor frame in two or more data transmission frames, and means for using at least one data transmission frame, containing part of said channel-coded silence descriptor frame, to transmit at least the background noise parameters.

The network element of the invention is characterized in that the network element comprises further:

means for forming at least a first silence descriptor frame to be transmitted at a time, said first silence descriptor frame comprising a silence descriptor identifier, means for channel coding of said first silence descriptor frame, to form a channel-coded silence descriptor frame, means for transmitting said channel-coded silence descriptor frame in two or more data transmission frames, and means for using at least one data transmission frame, containing part of said channel-coded silence descriptor frame, to transmit at least the background noise parameters.

The invention is based on the idea to utilize interleaving of data frame elements presently used in the transmission of data frames, wherein upon transmission of silence descriptor frames, only the silence descriptor identifier is transmitted in the first data frame, and parameters related to this background noise are transmitted in the next data frame.

The invention gives significant advantages to the methods and communication systems of prior art. The invention makes it possible to distinguish between silence descriptor frames and other data frames in a more reliable way also in data transmission at a lower bit rate than is possible to achieve in methods and communication systems of prior art. As a result, the use of such a communication system is more convenient, because speech and background noise are received more reliably, wherein the intelligibility of speech is improved and also possible disturbing noise occurs less frequently than in communication systems of prior art.

BRIEF DESCRIPTION OF THE DRAWINGS

In the following, the invention will be described in more detail with reference to the appended drawings, in which FIGS. 4a–4d show, in skeleton diagrams, the interleaving of silence descriptor frames in a communication system of prior art.

DETAILED DESCRIPTION OF THE PREFERRED EMBODIMENT(s)

Although, in connection with the description of the present invention, the GSM system mobile communication system is used as an example, the invention is not restricted solely to this mobile communication system but the invention can be used also in other communication systems using data transmission in data frames and interleaving.

Figure 6:
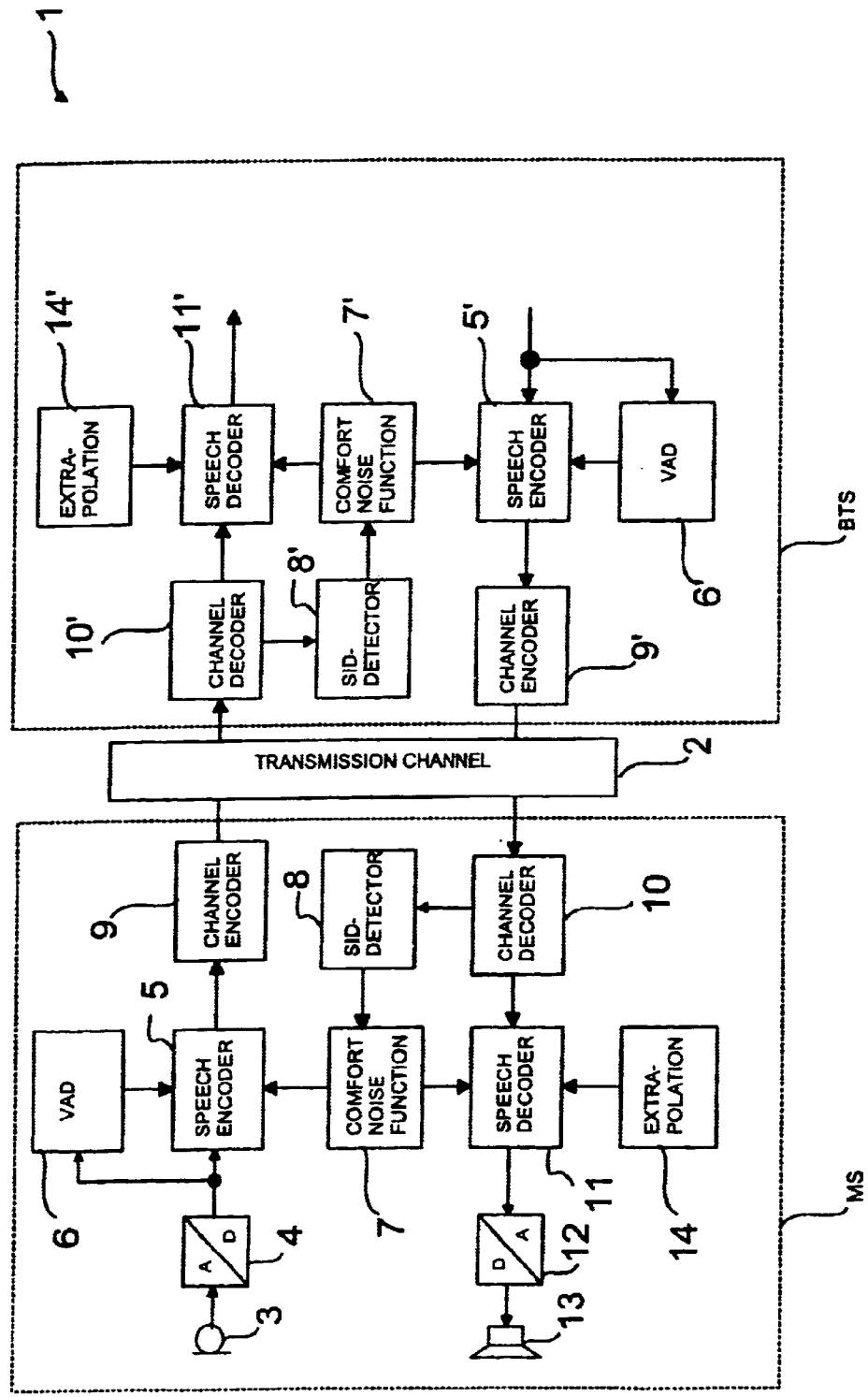
FIG. 6 shows, in a block chart, a communication system according to an advantageous embodiment of the present invention.

FIG. 6 is a reduced block chart illustrating a communication system 1 in which the invention can be applied. The communication system 1 of FIG. 6 consists of a mobile station MS and a base transceiver station BTS which is in a data transmission connection with the same via a communication channel 2. The communication channel 2 is implemented advantageously as radio-frequency data transmission, wherein the mobile station MS and the base transceiver station BTS are, in a manner known as such, each equipped with a radio transmitter/receiver, which is not shown separately in the appended figures. The base transceiver station BTS communicates advantageously with a base station controller (not shown), via which data can be transmitted in the communication system and also to a landline telecommunication network. The mobile station MS and the base transceiver station BTS comprise substantially similar operational blocks which in the reference numbering are distinguished from each other so that the reference numerals of the base transceiver station BTS include an additional apostrophe (').

In the GSM mobile communication system (Global System for Mobile Communications), speech encoding and decoding in the network is performed in a Transcodec Rate Adaptation Unit (TRAU). For clarity, there is only presented a speech encoder 5' and a speech decoder 11' of this Transcodec Rate Adaptation Unit in FIG. 6. In this preferred example the Transcodec Rate Adaptation Unit is implemented in the base tranceiver station BTS, but it can also be performed in some other network element, such as in a base station controller or in a mobile switching centre, which, however are not shown in the appended figures.

In the transmission of speech from the mobile station MS to the base transceiver station BTS, the signal of a microphone 3 is converted into an electric analog audio signal and converted into digital format in an analog/digital converter 4. The digital audio signal is transferred to a speech encoder 5. From the speech encoder 5, the digital signal is transferred to a speech activity detector 6 to examine whether the signal coming from the microphone is speech or background noise. On the basis of this, the speech activity detector 6 selects either speech frames generated by the speech encoder 5 or silence descriptor frames generated by a background noise generator 7, to be transmitted. The background noise generator 7 can also comprise a selection block (not shown), in which silence descriptor frames can be provided with other signalling data, as will be described below in this specification. These frames are channel-coded in a channel encoder 9, in which the channel-coded frames are also interleaved to form data transmission frames, as described above in this specification. The data frames are transmitted in the communication channel 2 to a receiving device, in this example to a base transceiver station BTS. Deinterleaving and channel decoding takes place in a channel decoder 10' in the base transceiver station BTS. The data frames are transferred to the speech decoder 11', in which a digital audio signal is generated to be transmitted to a mobile communication network and further to a receiving telecommunication terminal (not shown). A silence descriptor frame detector 8' detects silence descriptor frames from the decoded channel frames and controls a silence descriptor generator 7' in the base transceiver station to generate a background noise signal in the speech decoder 11'. In situations where there are no updated background noise parameters available in the receiver, it is possible, if necessary, to use a calculation block 14' to generate background noise on the basis of previously received background noise parameters advantageously by extrapolation or interpolation. If silence descriptor frames also include an extra signalling channel, the silence descriptor frame detector 8' advantageously transmits such a frame to a signal processing block (not shown) or the like. Data transmission from the base transceiver station BTS to the mobile station MS takes place in a corresponding way, wherein a digital audio signal is converted in the mobile station into analog format with a digital/analog converter 12 and transferred to an earpiece 13 or the like. In view of the present invention, it is not significant as such whether information is transmitted from the mobile station MS to the base transceiver station BTS or vice versa.

In this specification, the terms speech frame SP, silence descriptor frame SID and background noise parameter frame SIG-CH are used to describe data frames before channel coding and after channel decoding. In channel coding, the data frames are formed into channel-coded frames which are, consequently, subjected to said interleaving at the transmission stage. In a corresponding manner, data transmission frames 401–404, 501–504 refer to frames formed of these data frames after channel coding and interleaving, to be transmitted to the communication channel. Herein below in this specification, an example of interleaving will be used, in which the channel-coded frame is divided into two data transmission frames 401–404, 501–504, but the invention can also be applied in communication systems according to other division principles.

In half-rate speech coding in the GSM system, a silence descriptor frame SID comprises 33 bits for coding background noise parameters. The remaining 79 bits of the silence descriptor frame constitute a silence descriptor identifier SID-CW. Of these 79 identification bits of the silence descriptor frame, 62 bits are protected from channel errors and the remaining 17 bits are transmitted without protection. In the GSM mobile communication system, the silence descriptor identifier SID-CW is formed in a way that all the bits are set in a certain state (e.g. all bits are set in the logical 1 or 0 state). However, this is not significant as such for applying the invention, but in practical systems, the silence descriptor identifier SID-CW used can be also another bit combination that is not allocated for another purpose in the system. At the receiving stage, it is advantageous to use a silence descriptor frame detector 8, 8' which is aimed at detecting silence descriptor frames from the received data frames. This can be implemented e.g. in a way that the silence descriptor frame detector 8, 8', for which the term SID detector 8, 8' will be used herein below, examines that part of the received data frames that is allocated for the silence descriptor identifier SID-CW in the silence descriptor frame, and compares the logical values of these bits with corresponding bit values of the silence descriptor identifier used in the system. The more of those bits, in which the silence descriptor identifier SID-CW is transmitted, differs from the silence descriptor identifier, i.e. is in the logical 0 state in the present system, the more probable it is that the received data frame is not a silence descriptor frame. The received data frames are divided into four classes on the basis of the output signal of the SID detector 8, 8':

a valid SID frame,
an invalid SID frame,
a good speech frame, and
an unusable frame.

Table 1 illustrates how the output signal of the SID detector 8, 8' is formed. When almost all the bits in the field reserved for the silence descriptor identifier are in the logical 1 state, a SID flag in the SID detector 8, 8' is set in the value 2. In a situation where a large number of bits are in the value 0, the SID flag is set in the value 0. In other cases, the SID flag is set in the value 1. In this context, reference is made to European telecommunication standards GSM 06.41, GSM 06.22 and GSM 05.05, in which this silence descriptor frame detection algorithm of half-rate speech coding in the GSM system is described in more detail.

TABLE 1

| BFI flag | SID flag | | |
|---|---|---|---|
| | 2 | 1 | 0 |
| 0 | Valid SID frame | | Good speech frame |
| 1 | Invalid SID frame | | Unusable frame |

The appended FIGS. 4a–4d illustrate the transmission of data frames in a interleaved way in consecutive transmission frames in systems of prior art. In the figures, the transmission frames propagate from the left to the right, and the data transmission frames 401, 402, 403, 404 illustrate information to be transmitted in each transmission frame. In the data transmission frames 401–404, the first element 401a–404a consists of the latter element of the data frame to be transmitted in two parts, and the second element 401b–404b consists of the first element of the data frame to be transmitted. In this example, SP frame refers to a speech frame, SID frame refers, correspondingly, to a silence descriptor frame, a random frame refers to a data frame containing in either in its first or second element extra information that is not used in decoding, and no transmission refers that the transmission frame is not actually transmitted. Further, FIGS. 4a–4d show a value for a state variable SP flag which indicates either speech transmission or background noise transmission. In this example, the logical value 1 of the state variable SP flag refers to the transmission of speech frames and, correspondingly, at the logical value 0, silence descriptor information is transmitted, wherein background noise is generated in the receiving device.

FIG. 4a illustrates a situation in which speech transmission is terminated and a silence descriptor frame is transmitted. The latter element of the second last speech frame preceding this situation has been transmitted in the first data transmission frame 401, which also contains the first element of the last speech frame preceding the pause. The next data transmission frame 402 to be transmitted contains the latter element of this last speech frame preceding the pause as well as the first element of the silence descriptor frame. The latter element of the silence descriptor frame is transmitted in a third data transmission frame 403, in which the latter element 403b contains random bits which are not used at the receiving stage. In this situation, a channel-coded data frame is not transmitted in the next burst, allocated for a fourth data transmission frame 404 in FIG. 4a, but the transmitter is switched off. Consequently, in this situation, the transmission of the latter part of the silence descriptor frame contains, in the latter element 403b of the third data transmission frame, random bits which are unnecessary in the transmission of information.

FIG. 4b illustrates a situation in which the length of the pause is so long that the noise parameters must be updated. Due to interleaving, the silence descriptor frame is transmitted in two data transmission frames 406, 407 which also contain random bits. However, in the burst of a data transmission frame 405 preceding the transmission of noise parameters and in the burst of the data transmission frame 408 following the same, no transmission takes place.

FIG. 4c illustrates a situation in which the transmission of speech frames is started immediately after updating of the noise parameters. The first data transmission frame 409 of FIG. 4c is not transmitted, but in the next data transmission frame 410, random bits and the first element of the silence descriptor frame are transmitted. In the next data transmission frame 411, the latter element of the silence descriptor frame as well as the first element of the first speech frame after the pause are transmitted. In the next data transmission frame 412 following this, the latter element of this first speech frame and the first part of the second speech frame after the pause are transmitted, correspondingly, etc.

Further, FIG. 4d illustrates a situation in which there is a short pause in the speech, lasting for a maximum of one speech frame. Thus, in the transmission of the speech preceding the pause, the latter element of the second last speech frame and the first element of the last speech frame are transmitted in a first data transmission frame 413 shown in FIG. 4d. In the next data transmission frame 414, the latter element of the last speech frame preceding the pause and the first element of the silence descriptor frame are transmitted. The latter element of the silence descriptor frame, as well as the first element of the first speech frame after the pause, are transmitted in a data transmission frame 415. Following this, from the data transmission frame 416 onward, the transmission of speech frames takes place in a way known as such.

Figure 5A:
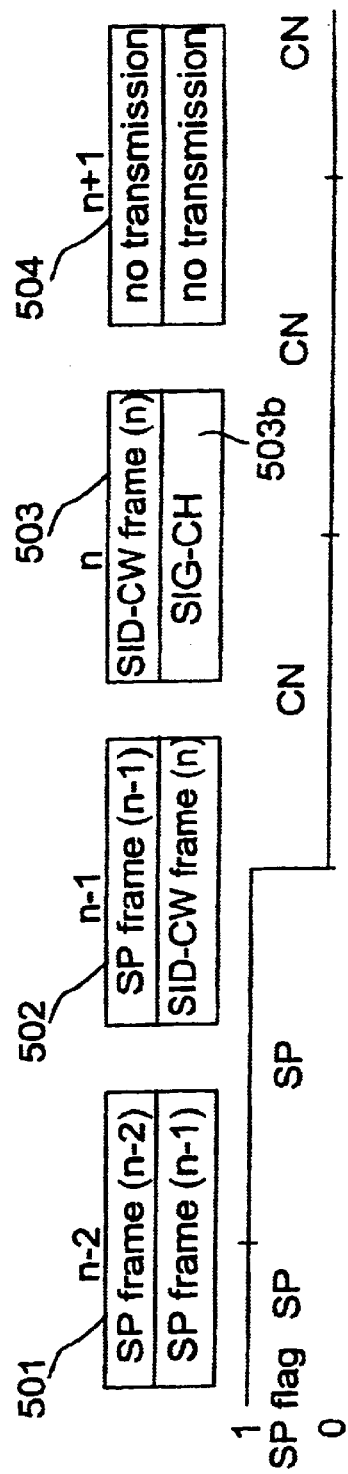
FIGS. 5a–5d show, in skeleton diagrams, the interleaving of silence descriptor frames in a communication system according to an advantageous embodiment of the invention.

Correspondingly, FIGS. 5a–5d illustrate the operation of a communication system 1 according to an advantageous embodiment of the present invention in situations in which the advantages of the invention are clearly visible. FIG. 5a shows a situation in which a pause after speech lasts longer than the length of one speech frame. Thus, the latter part of the second last speech frame preceding the pause and the first element of the last speech frame are transmitted in a data transmission frame 501. The next data transmission frame 502 contains the latter element of the last speech frame as well as the first element of the silence descriptor identifier SID-CW. The latter element of the silence descriptor identifier SID-CW is transmitted in a data transmission frame 503. The second element 503b of this data transmission frame 503 can be utilized as an additional signalling channel. This additional signalling channel can be used e.g. for the transmission of background noise parameters and possibly also information describing the quality of the channel. The data transmission frame 504 being in the transmission turn after this is not transmitted, but the transmitter (not shown) is switched off. The channel coder 9 codes the silence descriptor identifier SID-CW, after which interleaving is conducted with the latter element of the preceding speech frame, thereby forming data transmission frames 502 and 503. Next, the channel coder 9 encodes a signalling frame SIG-CH containing background noise parameters and possibly other information bits, by coding which is designed for this purpose and is not necessarily similar to than used for encoding speech frames. At this stage, the channel-coded background noise parameters are connected to the second element 503b of the data transmission frame 503 which can be transmitted to the communication channel 2 and decoded by a channel decoder 10, 10' in the receiving device. In the system of prior art, such a channel-coded half frame cannot be used. In this communication system 1 according to an advantageous embodiment of the invention, the transmission is switched off after the transmission of this data transmission frame 503; consequently, due to interleaving, the coding of the signalling frame must be implemented by another method, such as convolution coding, in which the coding rate is double to that in a normal situation. Thus, in this situation, the transmission of unnecessary information is avoided, and instead of random bits, the transmission to the receiver contains payload information which can be decoded from the data transmission frame and noise corresponding to the background noise parameters can be generated in the receiver.

In the receiver, decoding is conducted so that after receiving the data transmission frame 502, the receiver knows that the next frame 503 to be received contains a signalling frame whose length is, in this example, half of the length of a speech frame and a silence descriptor frame, and which is encoded by different coding. Thus, the corresponding decoding takes place in the receiver, to decode the signalling frame SIG-CH.

In this system according to an advantageous embodiment of the invention, the transmission of background noise parameters are delayed by one data transmission frame, because the silence descriptor frame SID contains primarily the silence descriptor identifier SID-CW. Generation of noise is started in this situation after the signalling frame SIG-CH is received and decoded. However, if the silence descriptor frame contains more bits than the length of the silence descriptor identifier SID-CW, the free bits of this frame can be used e.g. for the transmission of values giving a hint on the background noise parameters. However, if there are not sufficiently free bits in the silence descriptor frame even for a rough transmission of background noise parameters, it is possible to use e.g. noise calculated (extrapolated) on the basis of the previous received background noise parameters in the receiver. If the speech period has not yet lasted for a very long time, the background noise parameters calculated in this way correspond with a high probability to the correct background noise. On the other hand, this stabilizes the background noise to be generated in the receiver, because e.g. in a situation during a discontinuous transmission when the speech activity detector of a transmitting mobile station interprets a short side tone as speech, a delay causes no harm, because, in the system of the invention, background noise parameters preceding the side tone are used in decoding.

Figure 5B:
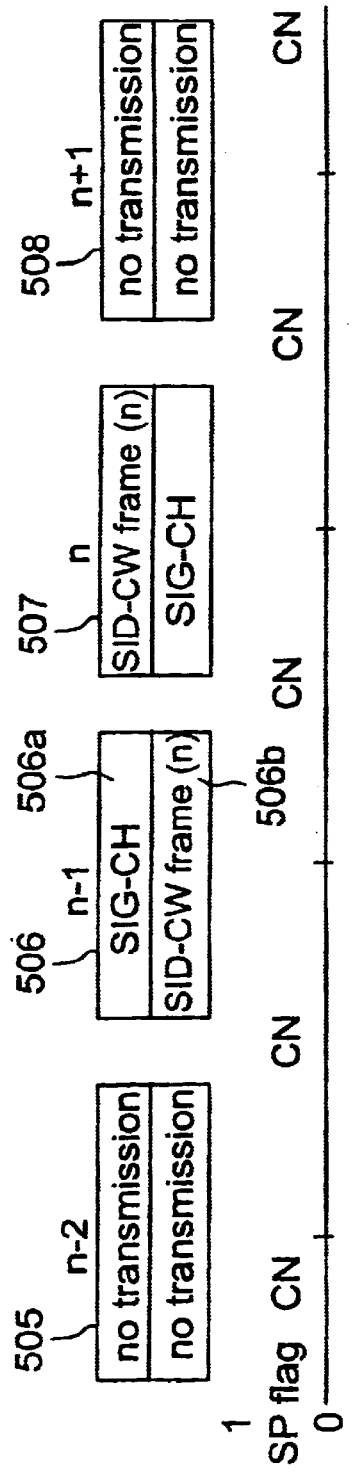

FIG. 5b shows the updating of background noise parameters during a longer pause in speech. The data transmission frame 505 is not transmitted, but the next data transmission frame 506 is transmitted. In this data transmission frame 506, the first element 506a can be used, if necessary, for the transmission of information, e.g. as a second extra signalling channel. In the receiver, this received first element 506a of the data transmission frame is stored temporarily, wherein after the receiver has received this first element 506a of the data transmission frame as well as the first element of the next data transmission frame 507, which contain the channel-coded silence descriptor identifier SID-CW, it is possible to deduce in the receiver that the stored first element 506a of the data transmission frame 506 contains extra signalling. This extra signalling channel can also be used for quality signalling e.g. in connection with the AMR system. The second element 506b of the data transmission frame contains the first element of the silence descriptor element. In this situation, the second element of the data transmission frame 507 can also be used as an extra signalling channel e.g. for the transmission of background noise parameters and possibly other information. After this, the transmission is cut off, that is, e.g. the data transmission frame 508 is not transmitted. Also in this situation, the data transmission frames to be transmitted contain more payload information than in the situation of FIG. 4b in the system of prior art.

Figure 5C:
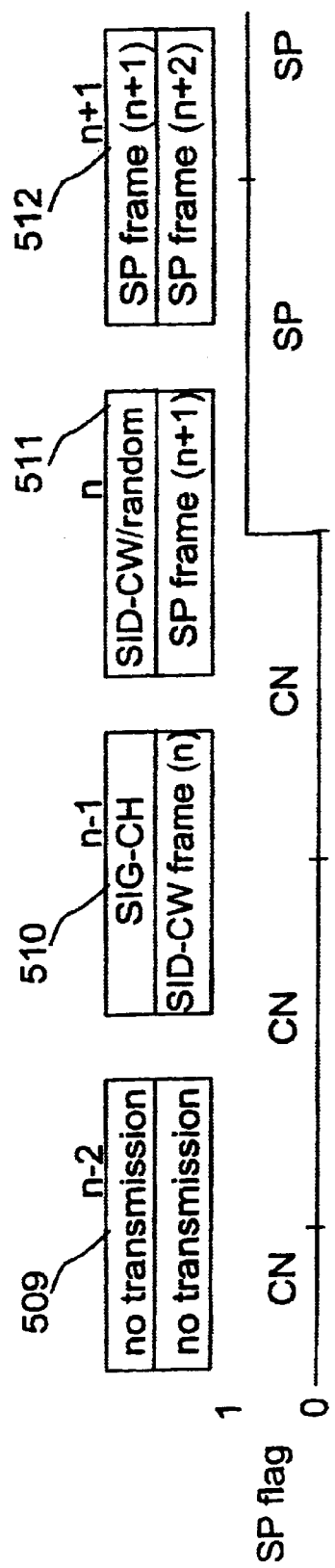

Correspondingly, FIG. 5c shows a situation in which the transmission of speech is started in connection with updating of background noise parameters. The silence descriptor frame SID-CW is channel-coded normally, and a data transmission frame 510 is formed, containing random bits and the first element of the silence descriptor identifier SID-CW. The data transmission frame 509 is not transmitted, but the next data transmission frame 510 is. After this, the SP flag is set in the logical 1 state, because the transmission of background noise is terminated. Thus, the channel coder changes the bits of the latter element of the silence descriptor frame waiting for interleaving in the transmission buffer, wherein in error detection in the receiver, it is found that the silence descriptor identifier transmitted in the data transmission frame 511 is incorrect and the frame is rejected. This will not cause any extraneous noise in the receiver. This data transmission frame 511 also contains the first element of the first speech frame following a pause, which is decoded by the decoder in the receiver and transferred to wait for the latter element of the speech frame transmitted in the next data transmission frame 512 which also contains the first element of the second speech frame. After this, the operation is continued in a way known as such.

Figure 5D:
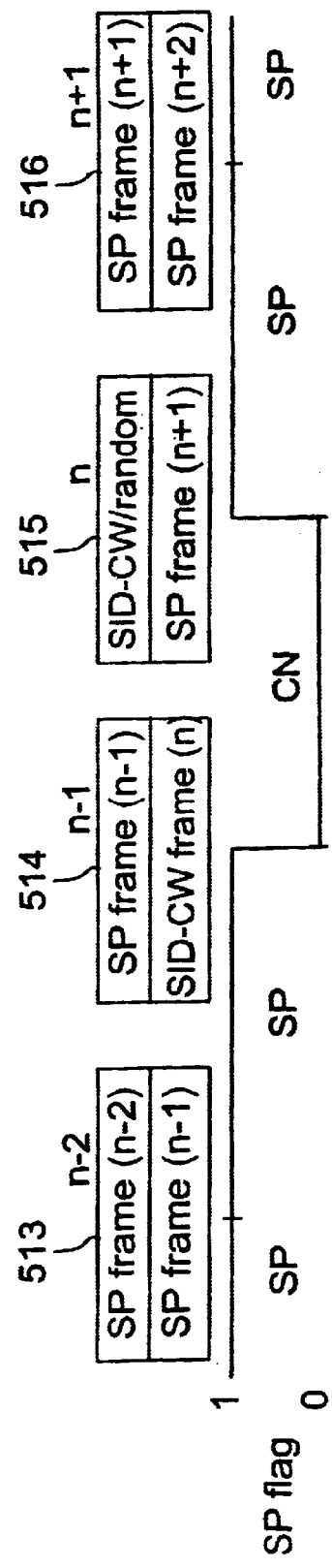

Furthermore, FIG. 5d shows a situation in which there is a pause in speech. Speech is transmitted in data transmission frames 513 and 514. Also the first element of the silence descriptor frame is transmitted here in connection with the preceding data transmission frame 514. The latter element of the silence descriptor frame is transmitted in the next data transmission frame 515 which also contains the first element of the first speech frame after the pause. Also in this situation, the silence descriptor frame is left without notice, as described above in connection with the description of FIG. 5c. After this, the transmission of the speech is continued in a data transmission frame 516.

It can be seen in FIGS. 5a–5d that in the communication system according to the invention, it is possible to use a longer silence descriptor identifier SID-CW than is possible in the methods of prior art, however in a way that more of the bits in the identifier can be protected when transmitted. This reduces the probability that a silence descriptor frame is identified as a speech frame or a speech frame is identified as a silence descriptor frame. However, the method of the invention does not require that extra data frames are transmitted, but those parts in the data transmission frames, in which only random information (bits) is transmitted in the systems of prior art, can be used as extra signalling channels for the transmission of information such as background noise parameters, quality signalling, etc.

Figure 1:
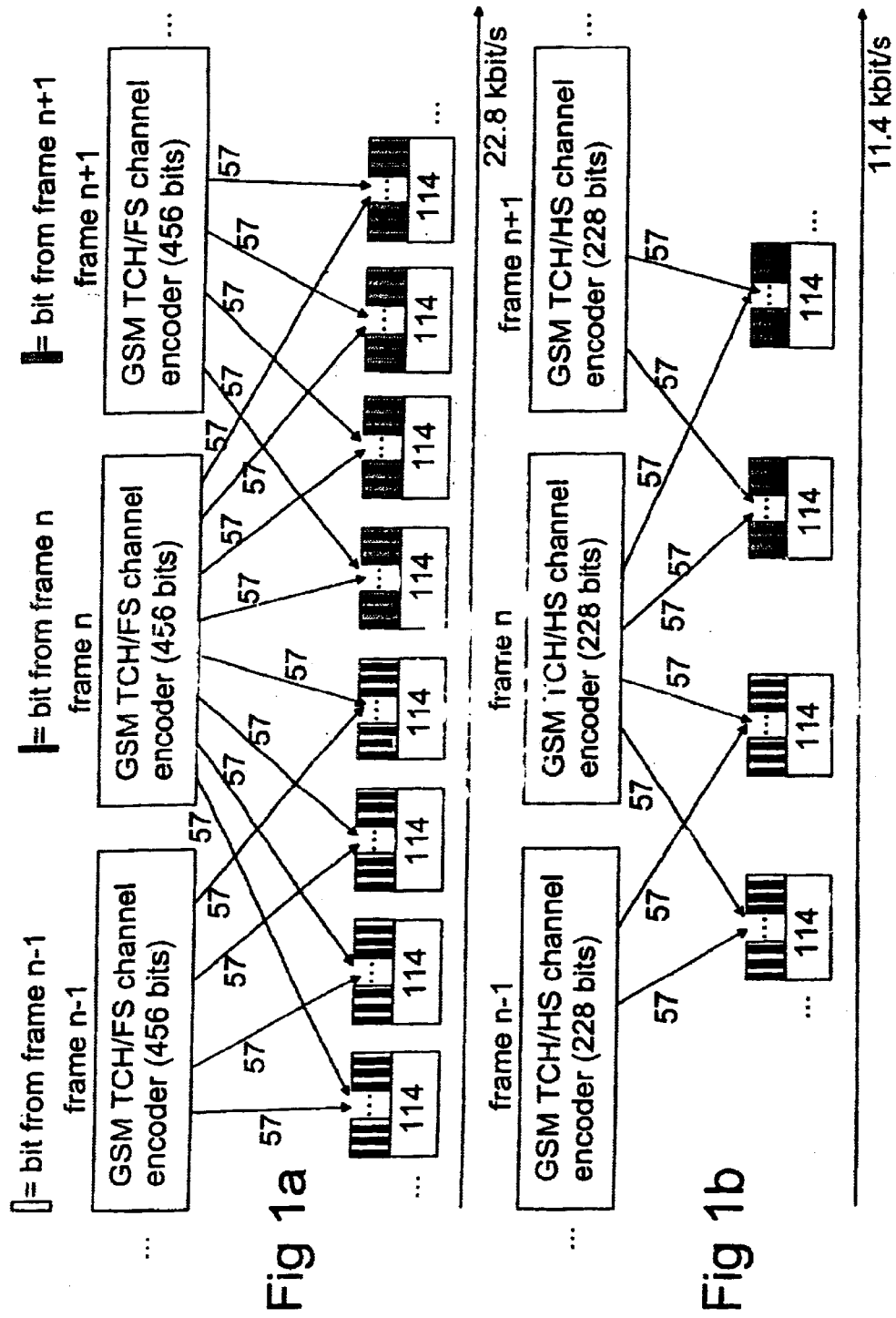
FIGS. 1a and 1b illustrate interleaving of data frames used in the GSM system.
Figure 2:
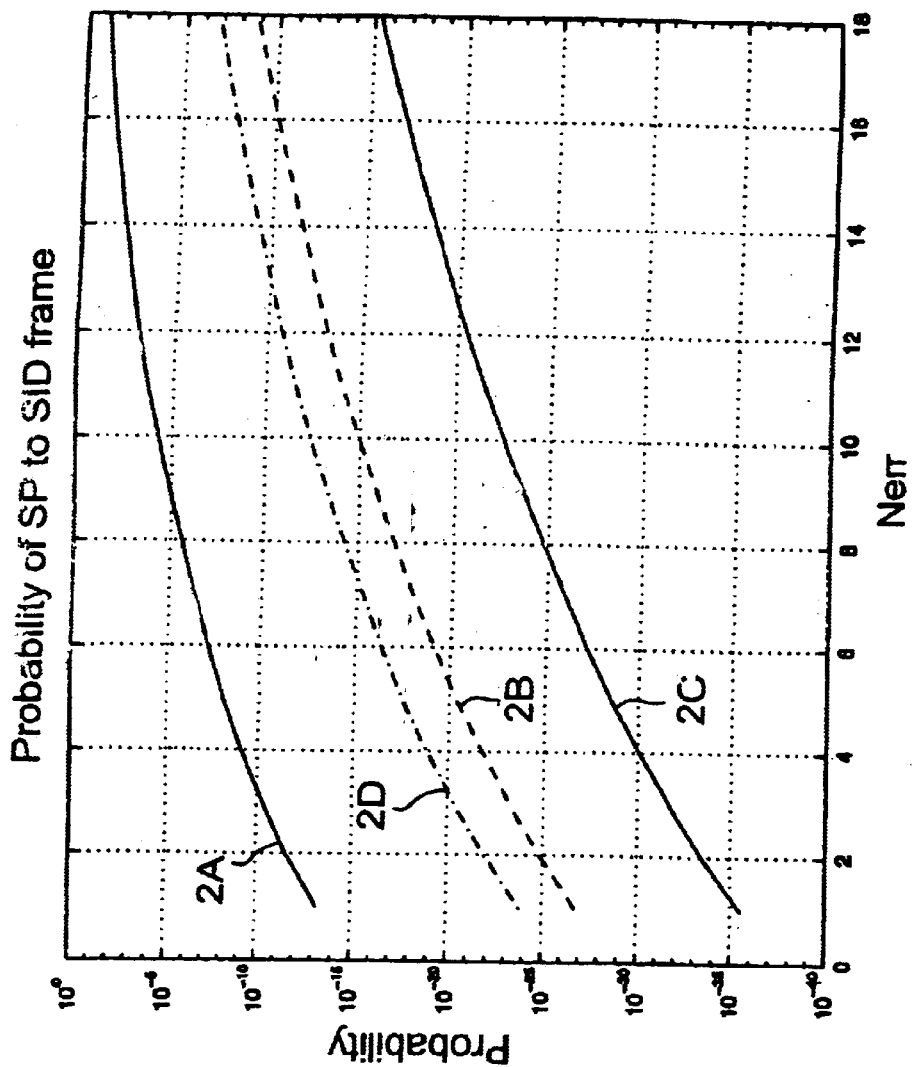
FIG. 2 shows graphically error probability rates for identifying a speech frame as a silence descriptor frame.
Figure 3:
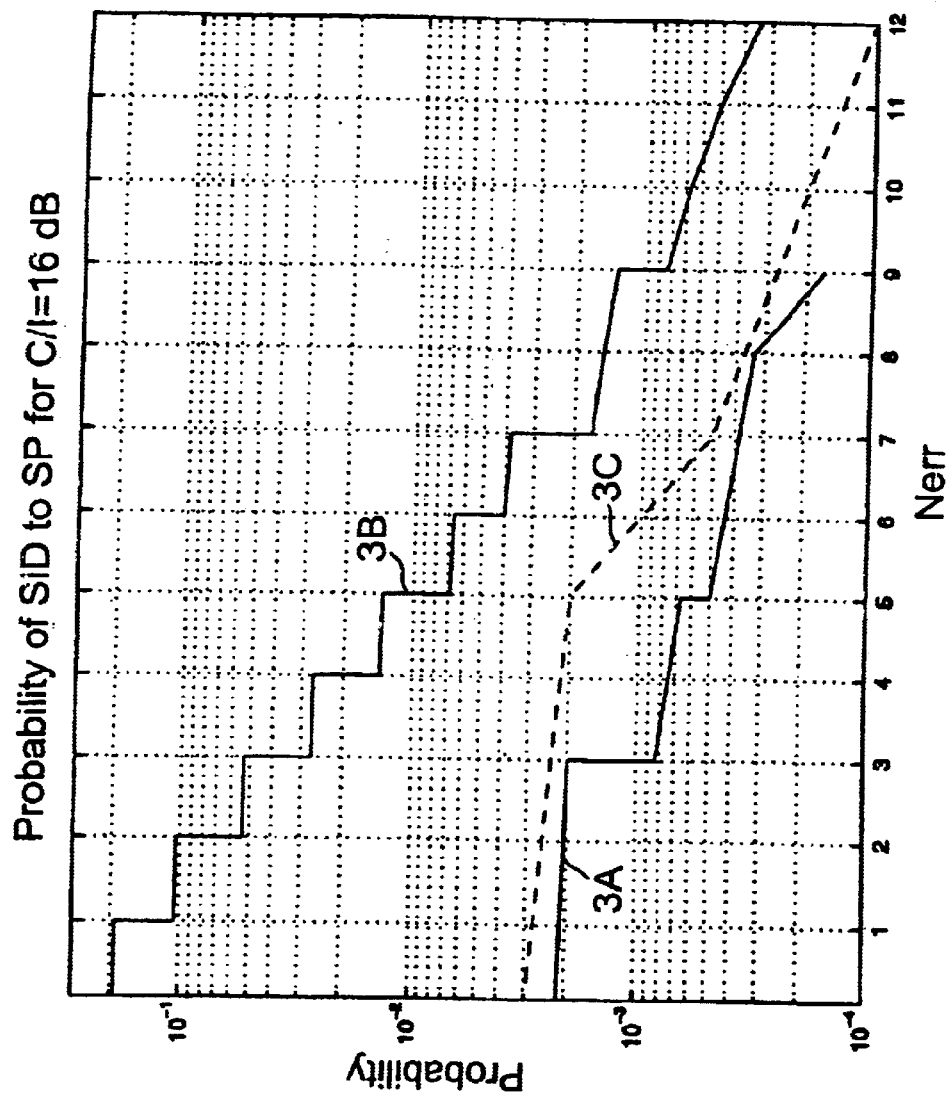
FIG. 3 shows graphically error probability rates for identifying a silence descriptor frame as a speech frame.

For example in half-rate speech coding in the GSM system, it would be possible by the method of the invention to use a silence descriptor identifier SID-CW of 118 bits. In the communication system according to the invention, 94 bits of these 118 bits can be placed in the silence descriptor frame SID, and of these, 77 bits can be protected and 17 bits are transmitted without protection. The remaining 24 bits in the silence descriptor identifier are protected bits of the signalling frame SIG-CH. FIG. 2 illustrates an error probability rate also in this system of the invention that a speech frame is decoded as a silence descriptor frame. FIG. 2 indicates an obvious improvement to the systems of prior art.

The present invention is not restricted solely to the embodiments presented above, but it can be modified within the scope of the appended claims.

What is claimed is:

1. A method for improving the detectability of a data frame transmitting background noise information including a silence descriptor identifier and background noise parameters, in a communication system in which the information to be transmitted is formed into data frames, said data frames are subjected to channel coding to form channel-coded frames, said channel-coded frames are interleaved to be transmitted in two or more data transmission frame, and information of two channel-coded frames is transmitted in each data transmission frame whereinfirst silence descriptor frame is formed provided with the silence descriptor identifier, said first silence descriptor frame is subjected to channel coding to form a channel-coded silence descriptor frame, said channel-coded silence descriptor frame is transmitted in two or more data transmission frames, and at least one data transmission frame transmitting part of said channel-coded silence descriptor frame is also used to transmit at least the background noise parameters.

2. A method according to claim 1, wherein said channel-coded frames are interleaved to be transmitted in two successive data transmission frames, wherein half of the bits of the two data transmission frames transmitting part of said channel-coded silence descriptor frame are reserved for the channel-coded silence descriptor frame, and the other bits of one of said two data transmission frames contain the background noise parameters.

3. A method according to claim 1, wherein the information describing the quality of the data transmission is transmitted in the extra signalling channel (SIG-CH).

4. A method according to claim 1, wherein the data frames are half-rate speech channel (HR) data frames of the GSM system.

5. A method according to claim 1, wherein the data frames are full-rate speech channel (FR) data frames of the GSM system.

6. A communication system providing improved detectability of a data frame transmitting background noise information including a silence descriptor identifier and background noise parameters, the communication system comprising means for forming data frames of information to be transmitted, means for channel coding said data frames to form channel-coded data frames, means for interleaving said channel-coded data frames for transmission in two or more data transmission frames, wherein information of two channel-coded frames is arranged to be transmitted in each data transmission frame, wherein in that the communication system comprises further:

means for forming at least a first silence descriptor frame to be transmitted at a time, said first silence descriptor frame comprising a silence descriptor identifier, means for channel coding of said first silence descriptor frame, to form a channel-coded silence descriptor frame, means for transmitting said channel-coded silence descriptor frame in two or more data transmission frames, and means for using at least one data transmission frame, containing part of said channel-coded silence descriptor frame, to transmit at least the background noise parameters.

7. A communication system (1) according to claim 6, further comprising means for interleaving said channel-coded frames to be transmitted in two successive data transmission frames, wherein half of the bits of the two data transmission frames transmitting part of said channel-coded silence descriptor frame are reserved for the channel-coded silence descriptor frame, and the other bits of one of said two data transmission frames contain the background noise parameters.

8. A communication system (1) according to claim 6, wherein the means (9, 9') for channel coding comprise a convolution coder.

9. A mobile stations providing improved detectability of a data frame transmitting background noise information including a silence descriptor identifier and background noise parameters, the mobile station comprising means for forming data frames of information to be transmitted, for channel coding said data frames to form channel-coded data frames, means for interleaving said channel-coded data frames for transmission in two or more data transmission frames, wherein information of two channel-coded frames is arranged to be transmitted in each data transmission frame, wherein the mobile station comprises further:

means for forming at least a first silence descriptor frame to be transmitted at a time, said first silence descriptor frame comprising a silence descriptor identifier, means for channel coding of said first silence descriptor frame, to form a channel-coded silence descriptor frame, means for transmitting said channel-coded silence descriptor frame in two or more data transmission frames, and means for using at least one data transmission frame, containing part of said channel-coded silence descriptor frame, to transmit at least the background noise parameters.

10. A network element providing improved detectability of a data frame transmitting background noise information including a silence descriptor identifier and background noise parameters, the network element comprising means for forming data frames of information to be transmitted, means for channel coding said data frames to form channel-coded data frames, means for interleaving said channel-coded data frames for transmission in two or more data transmission frames, wherein information of two channel-coded frames is arranged to be transmitted in each data transmission frame, means for deinterleaving received data transmission frames, means for channel decoding, and means for restoring information from channel-decoded data frames, wherein the network elements comprises further:

means for forming at least a first silence descriptor frame to be transmitted at a time, said first silence descriptor frame comprising a silence descriptor identifier, means for channel coding of said first silence descriptor frame, to form a channel-coded silence descriptor frame, means for transmitting said channel-coded silence descriptor frame in two or more data transmission frames, and means for using at least one data transmission frame, containing part of said channel-coded silence descriptor frame, to transmit at least the background noise parameters.

11. A method according to claim 1, further comprising means for pausing the transmission of the data transmission frames after or before transmission of the data transmission frame which is used to transmit part of said channel-coded silence descriptor frame and the background noise parameters.

12. A method according to claim 1, wherein information describing a quality of the data transmission is transmitted in the data transmission frame transmitting part of said channel-coded silence descriptor frame and the background noise parameters.

13. A communication system (1) according to claim 7, wherein the transmission of the data transmission frames is paused after or before transmission of said data transmission frame which is used to transmit part of said channel-coded silence descriptor frame and the background noise parameters.

14. The method of claim 1 wherein the silence descriptor identifier is adapted to be lengthened to improve a detectability of the first silence descriptor frame.

15. The method of claim 1 wherein the silence descriptor identifier is transmitted in a first data frame and parameters related to background noise are transmitted in a next data frame.

16. The method of claim 1 further comprising the step of using free bits of the first silence descriptor frame to transmit valves associated with the background noise parameters if the silence descriptor form contains more bits than a length of the silence descriptor identifier.

17. The method of claim 1 wherein a transmission of background noise parameters is delayed by one data transmission frame.

18. The communication system of claim 6 wherein the silence descriptor identifier is adapted to be lengthened to improve a detectability of the first silence descriptor frame.

* * * * *